United States Patent
Yu et al.

(10) Patent No.: US 10,306,176 B2
(45) Date of Patent: May 28, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Chang-geun Yu, Bucheon-si (KR); Jin Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/623,909

(22) Filed: Jun. 15, 2017

(65) Prior Publication Data

US 2018/0041731 A1 Feb. 8, 2018

(30) Foreign Application Priority Data

Aug. 3, 2016 (KR) .......................... 10-2016-0099029

(51) Int. Cl.
*H04N 5/44* (2011.01)
*H04N 5/63* (2006.01)
*G08C 17/02* (2006.01)

(52) U.S. Cl.
CPC ............... *H04N 5/63* (2013.01); *G08C 17/02* (2013.01); *H04N 5/4403* (2013.01); *G08C 2201/40* (2013.01); *G08C 2201/93* (2013.01)

(58) Field of Classification Search
CPC ............ H04N 5/63; H04N 5/44; G08C 17/02; H04W 84/12; H04W 88/04
See application file for complete search history.

(56) References Cited

U.S. PATENT DOCUMENTS

| | | | | |
|---|---|---|---|---|
| 2007/0201423 A1* | 8/2007 | Laroia | ................... | H04L 5/0035 370/345 |
| 2009/0017861 A1* | 1/2009 | Wu | ...................... | H04W 52/246 455/522 |
| 2013/0106820 A1* | 5/2013 | Seo | ....................... | H04N 13/341 345/211 |
| 2013/0124894 A1* | 5/2013 | Cho | ................... | H04W 52/0229 713/323 |
| 2013/0250832 A1 | 9/2013 | Kim et al. | | |
| 2013/0335539 A1* | 12/2013 | Seo | ...................... | H04N 13/341 348/56 |
| 2014/0133375 A1* | 5/2014 | McDiarmid | ...... | H04W 52/0229 370/311 |

(Continued)

*Primary Examiner* — Chi Ho A Lee
(74) *Attorney, Agent, or Firm* — Staas & Halsey LLP

(57) ABSTRACT

A display apparatus includes a communicator configured to be operable in one of a first state, which enables communications, and a second state, which disables the communications, to receive a beacon signal for connecting with an external apparatus; a display; and a controller configured to control the communicator to operate in the first state to receive the beacon signal for signal receiving sections corresponding to transmission times of the beacon signal and a second state for remaining sections, and in response to the communicator not receiving the beacon signal for the signal receiving sections in the first state, to control the communicator to adjust the signal receiving sections to receive the beacon signal. With this, if the beacon signals for connecting with the external apparatus are not normally received, the display apparatus may adjust the signal receiving sections to maintain the connection with the external apparatus.

16 Claims, 12 Drawing Sheets

(56) References Cited

U.S. PATENT DOCUMENTS

| | | | |
|---|---|---|---|
| 2016/0183205 A1* | 6/2016 | Li | H04W 8/005 370/350 |
| 2016/0269971 A1* | 9/2016 | Kim | H04W 16/14 |
| 2018/0014181 A1* | 1/2018 | Nakahara | H04W 8/22 |

* cited by examiner

DISPLAY APPARATUS AND CONTROL METHOD THEREOF

CROSS-REFERENCE TO RELATED APPLICATION

This application claims priority from Korean Patent Application No. 10-2016-0099029, filed on Aug. 3, 2016 in the Korean Intellectual Property Office, the disclosure of which is incorporated herein in its entirety by reference.

BACKGROUND

Field

Apparatuses and methods consistent with exemplary embodiments relate to a display apparatus and a control method thereof, and more particularly to a display apparatus for receiving a beacon signal to connect with an external apparatus and a control method thereof.

Description of Related Art

Among technics for remotely turning on a television (TV) or a computer, a technic for turning on a device connected to the network via a wireless local area network (LAN) is called a wake-on-wireless LAN (WoWLAN). The WoWLAN is a method, which wakes up a particular device by broadcasting a particular type of magic packet data in which a MAC address corresponding to an identification (ID) of the device to be waken up is included, based on the network connection.

To allow the device to receive the magic packet via the WoWLAN, for example, a wireless fidelity (Wi-Fi) module of the device is maintained in a state where it is connected to an access point (AP) by the wireless LAN even if the device is operated in a power save mode. For this, the device receives beacons periodically transmitted from the AP, thereby enabling the device to maintain the connection with the AP.

However, if frequency channels serviced by the AP are busy or malfunctions occur in the AP, beacon emission is delayed and thus the device may not receive the beacons. In this case, there is a problem in that even if the device is actually connected with the AP, it does not receive the beacons and thereby does not perform the WoWLAN function.

SUMMARY

Exemplary embodiments address at least the above problems and/or disadvantages and other disadvantages not described above. Also, the exemplary embodiments are not required to overcome the disadvantages described above, and may not overcome any of the problems described above.

The exemplary embodiments may provide a display apparatus for adjusting a signal receiving section to receive a beacon signal for connecting with an external apparatus and a control method thereof.

Also, the exemplary embodiments may provide a display apparatus for enabling a WoWLAN function even in exceptional circumstances, such as beacon emission delays or the like in a power save mode, and a control method thereof.

According to an aspect of an exemplary embodiment, there is provided a display apparatus including a communicator configured to be operable in one of a first state, which enables communications, and a second state, which disables the communications, to receive a beacon signal for connecting with an external apparatus; a display; and a controller configured to control the communicator to operate in the first state to receive the beacon signal for at least one signal receiving section corresponding to at least one transmission time for the beacon signal and a second state for remaining sections, and in response to the communicator not receiving the beacon signal for the at least one signal receiving section in the first state, to control the communicator to adjust the at least one signal receiving section to receive the beacon signal.

According to the exemplary embodiment as described above, if the beacon signals for connecting with the external apparatus are not normally received, the display apparatus, such as a TV, may adjust the signal receiving sections to receive the beacon signals, thereby normally receiving the beacon signals to stably maintain the connection with the external apparatus.

The controller may be configured to, in response to the display apparatus being operated in a power save mode, control the communicator to operate in the first state for the at least one signal receiving section and the second state for the remaining sections. Accordingly, the display apparatus may be operated in the communication-enabled state for the signal receiving sections corresponding to the transmission times of the beacon signals to allow it to be connected with the external apparatus even in the power save mode.

The controller may be configured to, in response to wake-up request information being received from the external apparatus in the power save mode, control the communicator to come to the first state for all the sections to operate in a normal mode. Thus, if receiving the wake-up request while receiving the beacon signals in the power save mode, the display apparatus may enter the normal mode to come to a state where it can continuously communicate with the external apparatus.

The controller may be configured to, in response to the beacon signal not being received for the at least one signal receiving section, control the communicator to increase the at least one signal receiving section in width. Thus, if the beacon signals are not received in the power save mode, the display apparatus may increase the width of the signal receiving sections to receive the beacon signals for the signal receiving sections, thereby maintaining the connection with the external apparatus even if the beacon signals are delayed.

The controller may be configured to, in response to the beacon signal being received for the at least one signal receiving section after increasing the at least one signal receiving section in width, control the communicator to decrease the at least one signal receiving section in width back again. Accordingly, if receiving the beacon signals after increasing the signal receiving sections in width, the display apparatus may decrease the signal receiving sections in width back again to receive the beacon signals in normal intervals.

The controller may be configured to, in response to the beacon signal not being received for the at least one signal receiving section, control the communicator to move the at least one signal receiving section. Accordingly, if the beacon signals are not received in the power save mode, the display apparatus may move the signal receiving sections to receive the beacon signals for the signal receiving sections, thereby maintaining the connection with the external apparatus even if the beacon signals are delayed.

The controller may be configured to in response to the beacon signal being received after moving the at least one signal receiving section, synchronize with the beacon signal in the moved at least one signal receiving sections. Thus, if receiving the beacon signals after moving the signal receiving sections, the display apparatus may synchronize with beacon signals in the moved signal receiving sections to receive the beacon signals in normal intervals.

The controller may be configured to, in response to the beacon signal not being received even after adjusting the at least one signal receiving section for a predetermined time or a predetermined number of times, control the communicator to end the connection with external apparatus. Thus, if the beacon signals are not received even after adjusting for the predetermined time or the predetermined number of times, the display apparatus may determine that it is a state where it cannot communicate with the external apparatus, and end the connection operation.

The controller may be configured to, in response to the beacon signal not being received for the at least one signal receiving section, determine whether the signal receiving section should be adjusted according to a user input. With this, if the beacon signals are not received, the user may directly determine whether to adjust the signal receiving sections.

The apparatus may further include a user input receiver configured to receive a user input, and the controller may be configured to set a period and a width of the at least one signal receiving section according to the user input. Accordingly, to receive the beacon signals, the user may directly set the period and the width of the signal receiving sections.

According to an aspect of another exemplary embodiment, there is provided a control method of a display apparatus including: controlling to operate in one of a first state, which enables communications, and a second state, which disables the communications, to receive a beacon signal for connecting with an external apparatus; controlling to operate in the first state to receive the beacon signal for at least one signal receiving section corresponding to at least one transmission time of the beacon signal and a second state for remaining sections; and in response to the beacon signal not being received for the at least one signal receiving section in the first state, adjusting the at least one signal receiving section to receive the beacon signal.

According to the exemplary embodiment as described above, if the beacon signals for connecting with the external apparatus are not normally received, the display apparatus, such as a TV, may adjust the signal receiving sections to receive the beacon signal, thereby normally receiving the beacon signals to stably maintain the connection with the external apparatus.

The method may further include, in response to the display apparatus being operated in a power save mode, controlling to operate in the first state for the at least one signal receiving section and the second state for the remaining sections. Accordingly, the display apparatus may be operated in the communication-enabled state for the signal receiving sections corresponding to the transmission times of the beacon signals to allow it to be connected with the external apparatus even in the power save mode.

The method may further include, in response to wake-up request information being received from the external apparatus in the power save mode, controlling to come to the first state for all the sections to operate the display apparatus in a normal mode. Thus, if receiving the wake-up request while receiving the beacon signals in the power save mode, the display apparatus may enter the normal mode to come to a state where it can continuously communicate with the external apparatus.

The adjusting may include, in response to the beacon signal not being received for the at least one signal receiving section, increasing the at least one signal receiving section in width. Thus, if the beacon signals are not received in the power save mode, the display apparatus may increase the width of the signal receiving sections to receive the beacon signals, thereby maintaining the connection with the external apparatus even if the beacon signals are delayed.

The adjusting may further include, in response to the beacon signal being received for the at least one signal receiving section after increasing the at least one signal receiving section in width, decreasing the at least one signal receiving section in width back again. Accordingly, if receiving the beacon signals after increasing the width of the signal receiving sections, the display apparatus may decrease the width of the signal receiving sections back again to receive the beacon signals in normal intervals.

The adjusting may include, in response to the beacon signal not being received for the at least one signal receiving section, moving the at least one signal receiving section. Accordingly, if the beacon signals are not received in the power save mode, the display apparatus may move the signal receiving sections to ensure that the beacon signals are received, thereby maintaining the connection with the external apparatus even if the beacon signals are delayed.

The adjusting may further include, in response to the beacon signal being received after moving the at least one signal receiving section, synchronizing with the beacon signal in the moved at least one signal receiving section. Thus, if receiving the beacon signal after moving the at least one signal receiving section, the display apparatus may synchronize with the beacon signals in the moved signal receiving sections to receive the beacon signals in normal intervals.

The method may further include, in response to the beacon signal not being received even after adjusting the at least one signal receiving section for a predetermined time or a predetermined number of times, ending the connection with external apparatus. Thus, if the beacon signals are not received even after adjusting for the predetermined time or the predetermined number of times, the display apparatus may determine that it is a state where it cannot communicate with the external apparatus, and end the connection operation.

The method may further include, in response to the beacon signal not being received for the at least one signal receiving section, determining whether the at least one signal receiving section should be adjusted according to a user input. With this, if the beacon signals are not received, the user may directly determine whether to adjust the signal receiving sections.

The method may further include setting a period and a width of the at least one signal receiving section according to a user input. Accordingly, to receive the beacon signals, the user may directly set the period and the width of the signal receiving sections.

As described above, according to the exemplary embodiments, if the beacon signals for connecting with the external apparatus are not normally received, the display apparatus may adjust the signal receiving sections, thereby stably maintaining the connection with the external apparatus.

Also, according to the exemplary embodiments, the display apparatus may receive the beacon signals even in exceptional circumstances, such as beacon delays or the like in the power save mode, thereby enabling the WoWLAN function.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
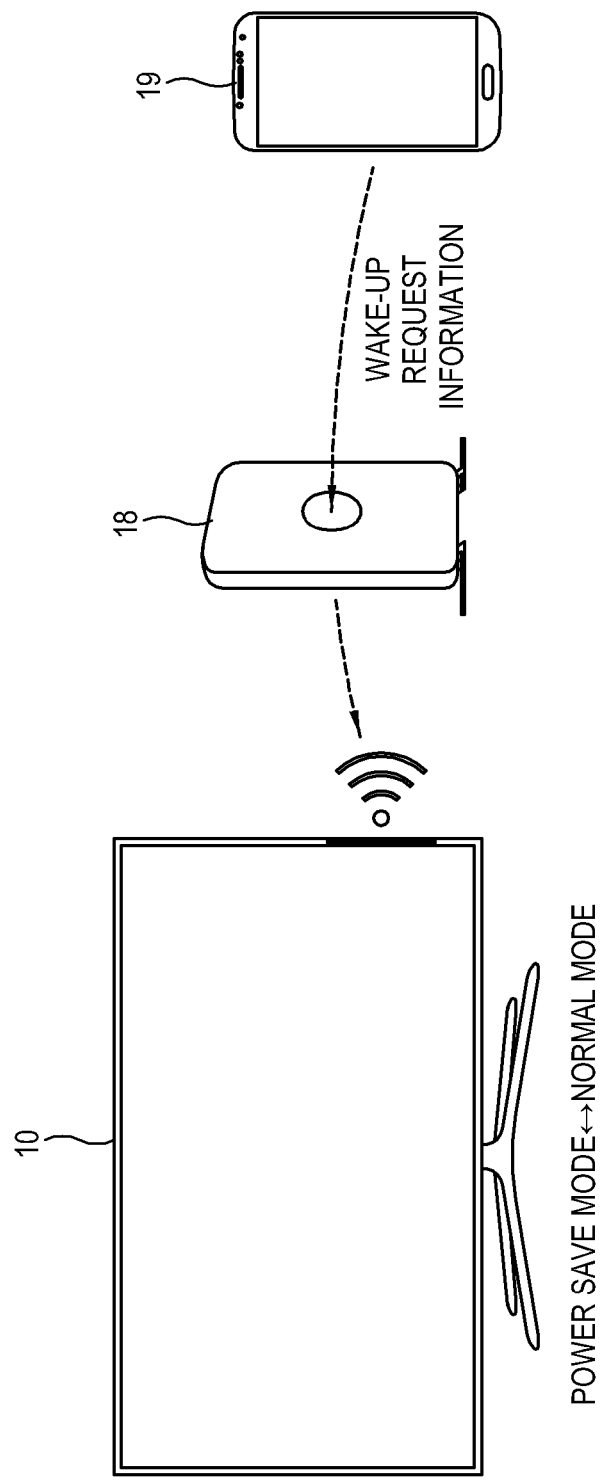
FIG. 1 is a schematic view illustrating an example in which a display apparatus according to an exemplary embodiment is connected with an external apparatus in a lower power mode and a normal mode.

With reference to accompanying drawings, exemplary embodiments will be described in detail for those skilled in the art to work the present disclosure without difficulty. The exemplary embodiments may be achieved in various forms, and are not limited to the embodiments provided herein. To clearly describe the exemplary embodiments, those unrelated to the description have been omitted, and like reference numerals denote like elements throughout this specification.

Hereinafter, primary operations of a display apparatus according to an exemplary embodiment and characteristics of respective elements included therein are first described in detail through FIGS. 1 and 2. FIG. 1 is a schematic view illustrating an example in which a display apparatus according to an exemplary embodiment is connected with an external apparatus in a lower power mode and a normal mode. As illustrated in FIG. 1, the display apparatus 10 is connected with the external apparatus 19 via a communication relay apparatus 18. The display apparatus 10 according to an exemplary embodiment may be implemented as, for example, a television (TV), a computer, and so on, and the external apparatus 19 may be implemented as, for example, a mobile device, such as a smart phone, a tablet personal computer (PC), and so on, which enables wireless communications. The display apparatus 10 may be operated in the lower power mode or the normal mode according to whether power saving is required. The display apparatus 10 may be operated in a power save mode where only a communication module for network connection is activated. If receiving a wake-up request for turning on power from the external apparatus 19 via the communication relay apparatus 18 in the lower power mode, the display apparatus 10 may start power supply to a main processor, i.e., a central processing unit (CPU), thereby to enter the normal mode from the lower power mode.

The communication relay apparatus 18 performs a function as an access point (AP) for wireless fidelity (Wi-Fi) connection. The communication relay apparatus 18 as one of apparatuses constituting a wireless LAN includes routing and network address translation (NAT) functions and may be implemented as, for example, a wireless router. The communication relay apparatus 18 may relay communication between the display apparatus 10 and the external apparatus 19 using the Wi-Fi communication method.

The display apparatus 10 receives wireless beacon signals, which are periodically transmitted from the communication relay apparatus 18, to connect with the communication relay apparatus 18. For instance, the communication relay apparatus 18 may transmit the beacon signals in intervals of 100 ms.

According to an exemplary embodiment, to receive the beacon signals in the power save mode, the display apparatus 10 establishes signal receiving sections corresponding to transmission times for beacon signals (for example, target beacon transmission times (TBTTs)), respectively. To more reduce power required to receive the beacon signals even in the lower power mode, the display apparatus 10 is operated in a first state, which enables communications, for the signal receiving sections corresponding to the transmission times for beacon signals and a second state, which disables the communications, for remaining sections other than the signal receiving sections. For example, the first state is a state where communication means is normally activated to enable the communications. The second state is a state where the communication means is not normally activated, i.e., a state where the power needed for carrying out the communications is not consumed, unlike the first state. In other words, since an amount of power needed in the second state is more decreased as compared to that needed in the first state, the display apparatus 10 may more save the power for communications. As an example, the display apparatus 10 may set a width of the signal receiving sections as 4 ms, which is ±2 ms before and after a point of time corresponding to each of the transmission times of the beacon signals, to receive the beacon signal. Accordingly, the display apparatus 10 may receive the beacon signals from the communication relay apparatus 18 for the communication-enabled signal receiving sections, so that it is connected with the external apparatus 19 via the communication relay apparatus 18. Also, the display apparatus 10 may set the remaining sections other than the communication-enabled signal receiving sections as the second state, which disables the communications, to save the power.

If the beacon signals are not received for the signal receiving sections, the display apparatus 10 adjusts the signal receiving sections to ensure that it receives the beacon signals. As an exemplary embodiment, if the beacon signals transmitted from the communication relay apparatus 18 are not received for the signal receiving sections, the display apparatus 10 may increase the signal receiving sections in width. As an example, if the communication relay apparatus 18 emits the beacon signals in intervals of 100 ms and then is confronted with overloads in used frequency channels due to increase in number of connected apparatuses, the beacon signals may be slightly delayed and emitted out of the period of 100 ms. In this case, the display apparatus 10 do not receive the delayed beacon signals for the signal receiving sections, and thus may misjudge as being disconnected with the communication relay apparatus 18. At this time, the display apparatus 10 may receive the delayed beacon signal by increasing the signal receiving sections in width, for example, from 4 ms to 10 ms, i.e., from ±2 ms to ±5 ms before and after the point of time corresponding to each of the transmission times of the beacon signals.

As another exemplary embodiment, if the beacon signals are not received for the signal receiving sections, the display apparatus 10 may move the signal receiving sections. As an example, the display apparatus 10 may receive the delayed beacon signal by moving the signal receiving sections, for example, to the right to correspond to the transmission times of the beacon signals.

If the beacon signals are not received even after adjusting the signal receiving sections by the method, which increases the signal receiving sections in width or moves the signal receiving sections in the delayed direction, for a predetermined time or a predetermined number of times, the display apparatus 10 may determine as being disconnected with the communication relay apparatus 18 and end the connection with the communication relay apparatus 18.

As described above, the display apparatus 10 according to the exemplary embodiments receives the beacon signals only for the minimum sections and not receive the beacon signals for the remaining sections other than the minimum sections, thereby maximizing power saving. Further, the display apparatus 10 according to the exemplary embodiments may adjust the sections for receiving the beacon signals according to circumstances, thereby reducing power consumption and improving reliability. Also, the display apparatus 10 according to the exemplary embodiments may receive the beacon signals even in a situation where in the lower power mode, the beacon signals are delayed and emitted from the communication relay apparatus 18, thereby enabling WoWLAN function.

Figure 2:
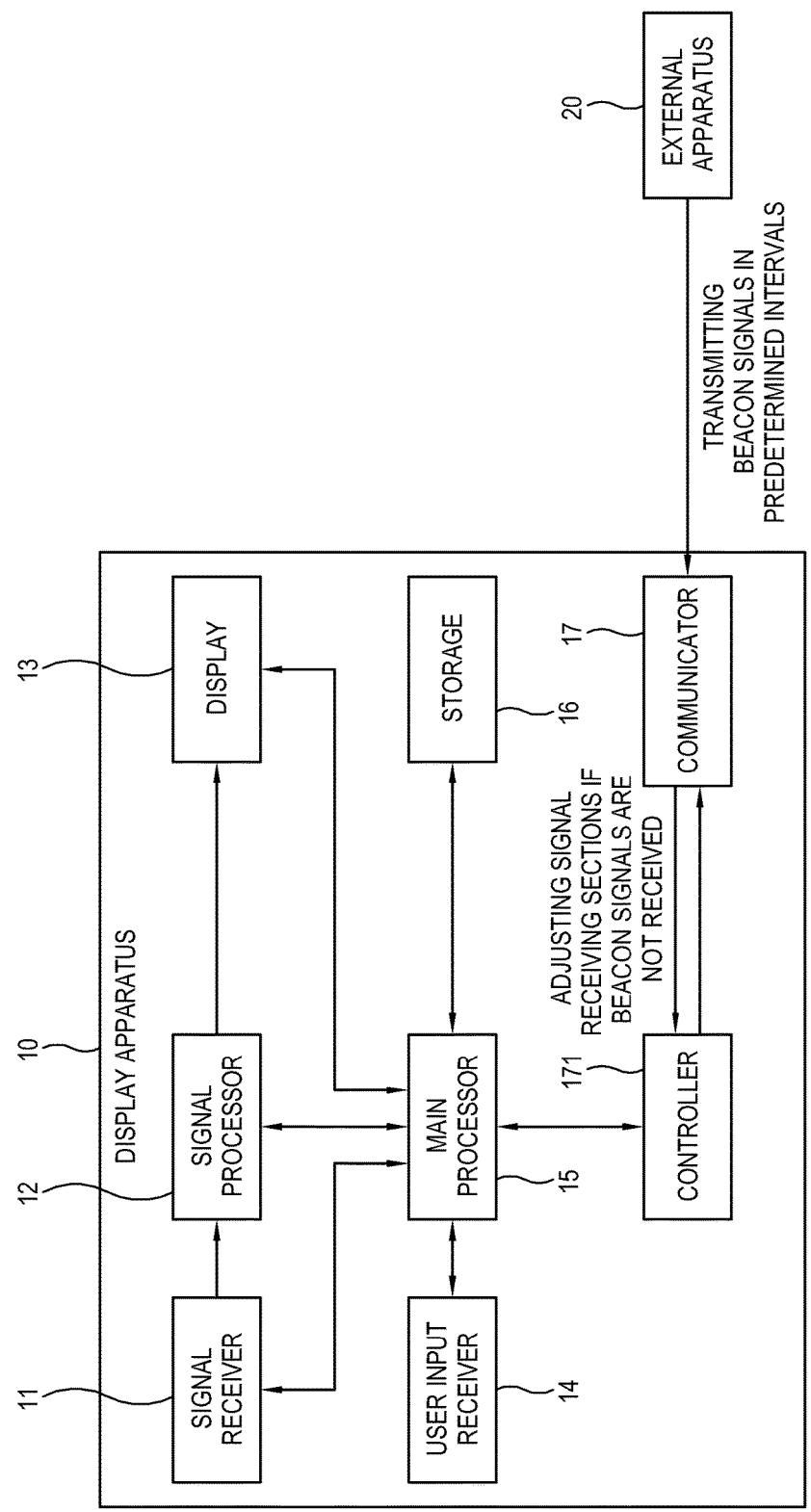
FIG. 2 is a block diagram illustrating a construction of a display apparatus according to an exemplary embodiment.

FIG. 2 is a block diagram illustrating a construction of a display apparatus according to an exemplary embodiment. As illustrated in FIG. 2, the display apparatus 10 according to an exemplary embodiment includes a signal receiver 11, a signal processor 12, a display 13, a user input receiver 14, a main processor 15, a storage 16, a communicator 17 and a controller 171. The display apparatus 10 may be implemented as, for example, a TV, a computer, and so on. The display apparatus 10 may be connected with an external apparatus 20 using communication methods, such as WiFi and the like. The external apparatus 20 may be implemented as an apparatus capable of communicating by wireless with the display apparatus 10, for example, a communication relay apparatus, such as a wireless router, which performs an AP function. If the external apparatus 20 is implemented as the communication relay apparatus, it may be perform a function for connecting the display apparatus 10 with other apparatuses. Also, the external apparatus 20 may be implemented as a mobile device, such as a smartphone, a tablet PC, or the like. If the external apparatus is implemented as the mobile device, it may be directly connected with the display apparatus 10 via a wireless communication. The components included in the display apparatus are not limited to the exemplary embodiment as described above, but may be configured removing some components therefrom or implemented including other additional components therein.

To receive beacon signals for connecting with the external apparatus 20, the display apparatus 10 is controlled to operate in one of a communication-enabled first state and a communication-disenabled second state. The display apparatus 10 is controlled to operate in the first state to receive beacon signals for signal receiving sections corresponding to transmission times of the beacon signals and the second state for remaining sections. If in the first state, the beacon signals are not received for the signal receiving sections, the display apparatus 10 adjusts the signal receiving sections to ensure that it receives the beacon signals.

According to the exemplary embodiment as described above, the display apparatus 10 may stably maintain the connection with the external apparatus by adjusting the signal receiving sections to allow the beacon signals to be received if the beacon signals for connection with the external apparatus 10 are not normally received. Accordingly, even in exceptional circumstances, such as beacon delays or the like in a power save mode, the display apparatus may receive the beacon signals, thereby enabling a WoWLAN function.

The signal receiver 11 receives a broadcasting signal or an image signal. The signal receiver 11 may be provided in various forms according to standards of the received broadcasting or image signal and implemented types of the display apparatus 10. For instance, the signal receiver 11 may be implemented as a tuner, which receives a radio frequency (RF) broadcasting signal or a satellite signal transmitted from a broadcasting station. As another example, the signal receiver 11 may receive an image signal from external apparatuses, for example, such as a digital versatile disc (DVD) player, a universal serial bus (USB) apparatus and so on. Like this, the signal receiver 11 is not limited to the exemplary embodiments as described above, and may be received the broadcasting signal or the image signal in variously implemented forms.

The signal processor 12 successively performs predetermined signal processings to the broadcasting signal or the image signal received from the signal receiver 11. The signal processings performed at the signal processor 12 may include, for example, decoding, de-interlacing, scaling, noise reduction, detail enhancement, and so on. Types of signal processings performed at the signal processor 12 are not limited to the exemplary embodiments as described above. The signal processor 12 may be implemented as a system-on-chip (SOC) in which such various functions are integrated, or an image processing board in which individual chipsets for independently performing processes are mounted.

The display 13 displays an image based on the broadcasting signal or the image signal processed at the signal processor 12. Implemented types of the display 13 are not limited, and the display 13 may be implemented in various forms, such as plasma display panel (PDP), liquid crystal display (LCD), organic light emitting diodes (OLED), flexible display, etc.

The user input receiver 14 receives a user input for controlling at least one function of the display apparatus 10. As an example, the user input receiver 14 may be implemented in the form of an input panel provided on an outside of the display apparatus 10, or as a remote controller, which communicates in an infrared method with the display apparatus 10. Further, the user input receiver 14 may be implemented as, for example, a keyboard, a mouse and so on, which are connected with the display apparatus 10. Also, the user input receiver 14 may be implemented as touch screen provided in the display apparatus 10.

The main processor 15 controls executions of program commands to allow all components included in the display apparatus 10 to perform corresponding operations. The main processor 15 may be implemented as a central processing unit (CPU), and include three areas, for example, a control area, an operation or calculation area and a register area. The control area interprets program commands and instructs respective components of the display apparatus 10 to operate according to senses of the interpreted program commands. The calculation area performs arithmetic and logic calculations, and performs calculations needed to operate the respective components of the display apparatus 10 according to the instructions of the control area. The register area as a memory location for storing information required while executing commands at the CPU, stores commands and data for the respective components of the display apparatus 10 and calculated results.

The communicator 17 communicates with the external apparatus 20. The communicator 17 may be provided with a printed circuit board (PCB) including a WiFi module. The communicator 17 may communicate with the external apparatus 20 using a WiFi communication method via the WiFi module. Communication methods of the communicator 17 is not limited thereto and the communicator 17 may communicate with the external apparatus 20 using communication methods other than the WiFi communication method.

To receive the beacon signals for connecting with the external apparatus 20, the communicator 17 may be operated in one of the communication-enabled first state and the communication-disenabled second state. While being operated in the communication-enabled first state, the communicator 17 may receive the beacon signals emitted from the external apparatus 20. However, while being operated in the communication-disenabled second state, the communicator 17 do not receive the beacon signals even if they are emitted from the external apparatus 20. While the display apparatus 10 is operated in the power save mode, the communicator 17 may be controlled to operate in the communication-enabled first state only for predetermined sections. With this, even in a state where the display apparatus 10 is operated in the power save mode, the communicator 17 may communicate with the external apparatus 20.

The controller 171 controls operations of the communicator 17. The controller 171 may be implemented as a processor, which executes commands for controlling the communicator 17. The controller 171 may be provided as a construction separate from the communicator 17 or in the form of, for example, a single chip in which the controller 171 is included in the communicator 17. The controller 171 controls the communicator 17 to operate in the first state to receive the beacon signals for the signal receiving sections corresponding to the transmission times of the beacon signals, and the second state for the remaining sections other than the signal receiving sections.

Figure 3:
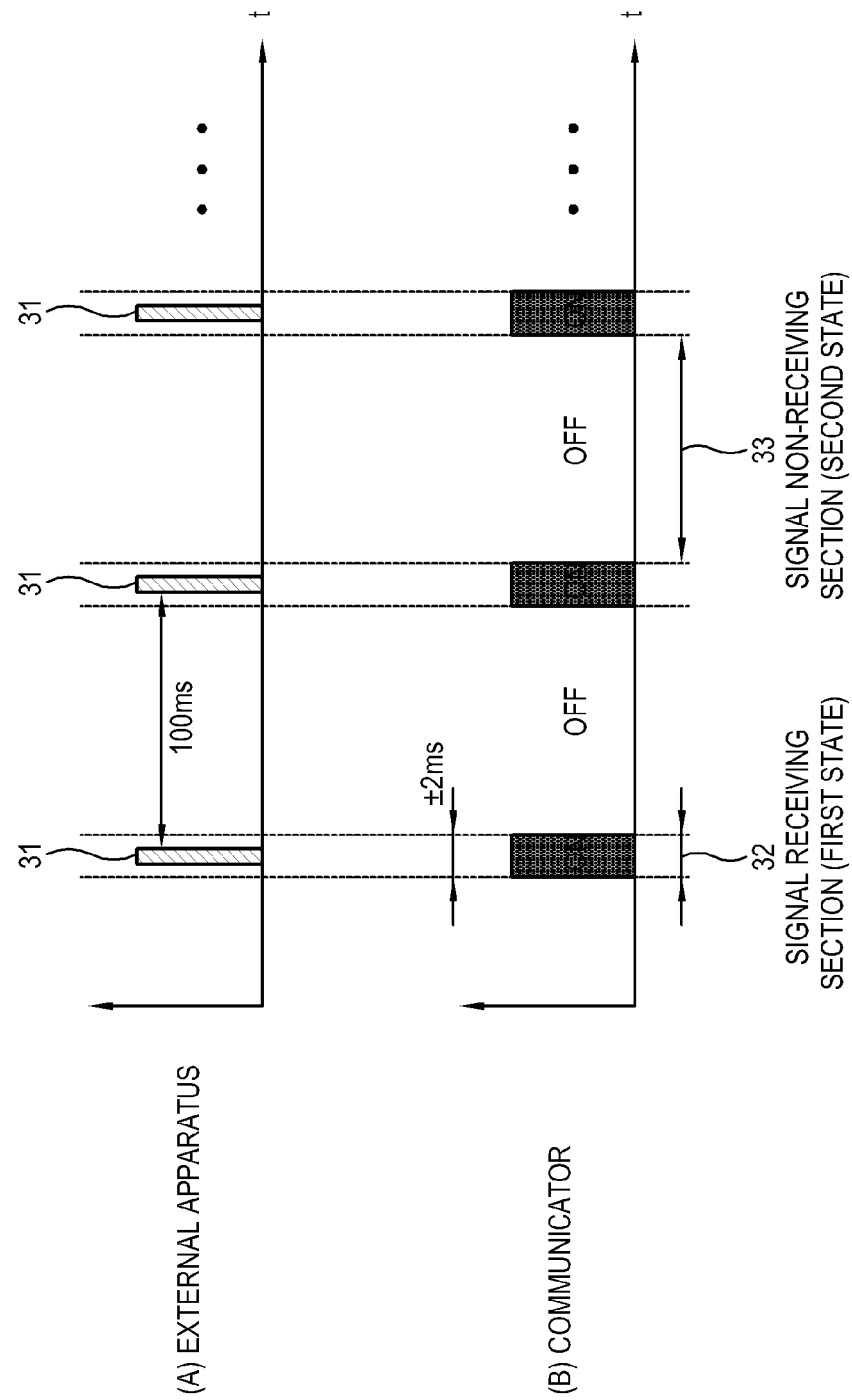
FIG. 3 is a waveform diagram illustrating an example of setting signal receiving sections to receive beacon signals from an external apparatus, according to an exemplary embodiment.

As an exemplary embodiment, if the display apparatus 10 is operated in the power save mode, the controller 171 may control the communicator 17 to operate in the first state for the signal receiving sections and the second state for the remaining sections. As an example, as illustrated in FIG. 3, the communicator 17 may be set to the communication-enabled first state to receive beacon signals 31 for signal receiving sections 32 corresponding to transmission times of the beacon signals 31 emitted in intervals of 100 ms, and the communication-disenabled second state for signal non-receiving sections 33. At this time, a period of the signal receiving sections 32 may be set to 100 ms, which is equal to the period of the beacon signals 31, and a width of the signal receiving sections 32 may be set to 4 ms (±2 ms). Here, the period and the width of the signal receiving sections 32 may also be set in default values in the display apparatus 10 or be set by a user input. With the exemplary embodiment as described above, the controller 171 may receive the beacon signals from the external apparatus 20 for the signal receiving sections 32, which enables the communications, thus to maintain the connection with the external apparatus 20.

Figure 4:
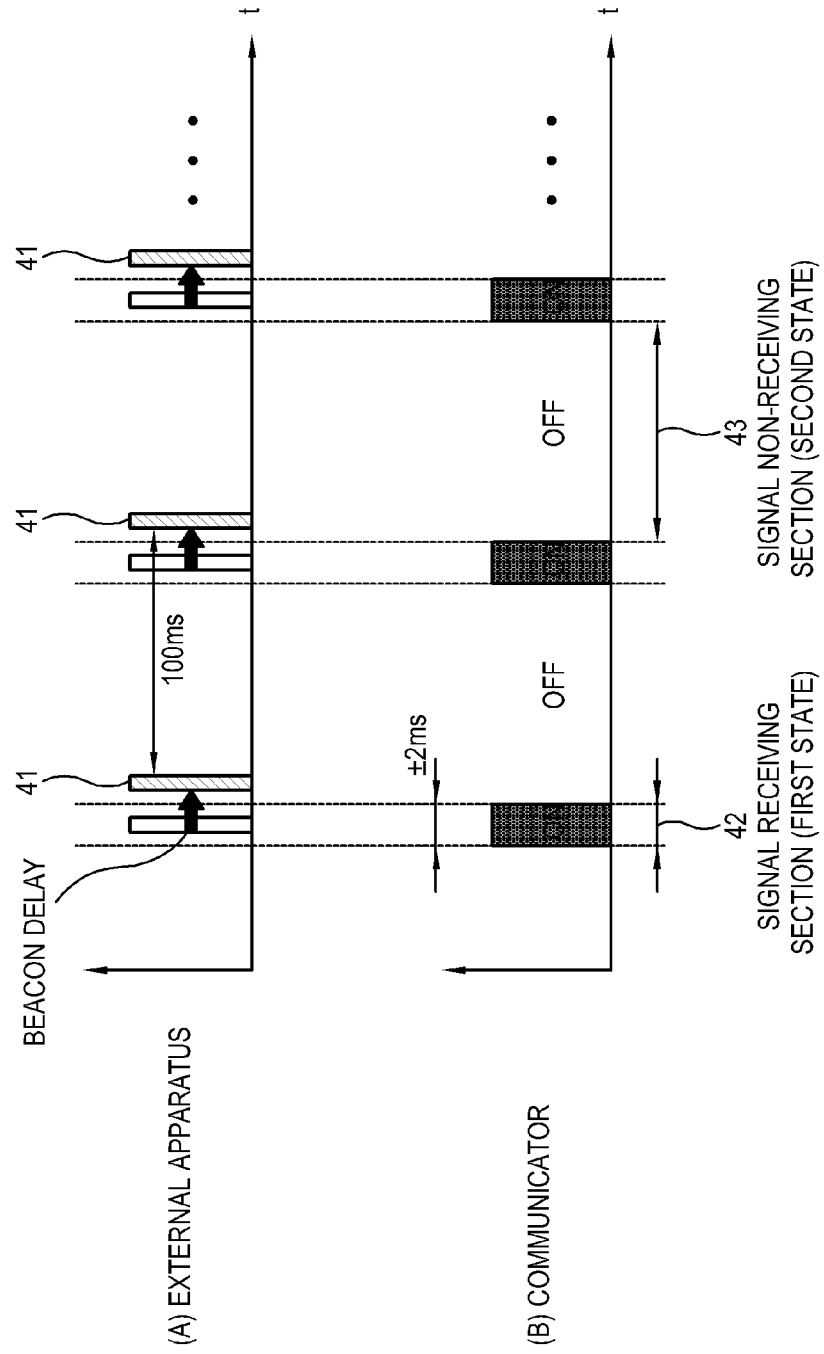
FIG. 4 is a waveform diagram illustrating an example in which the beacon signals are delayed, so that they are not received from the external apparatus for the signal receiving sections.
Figure 5:
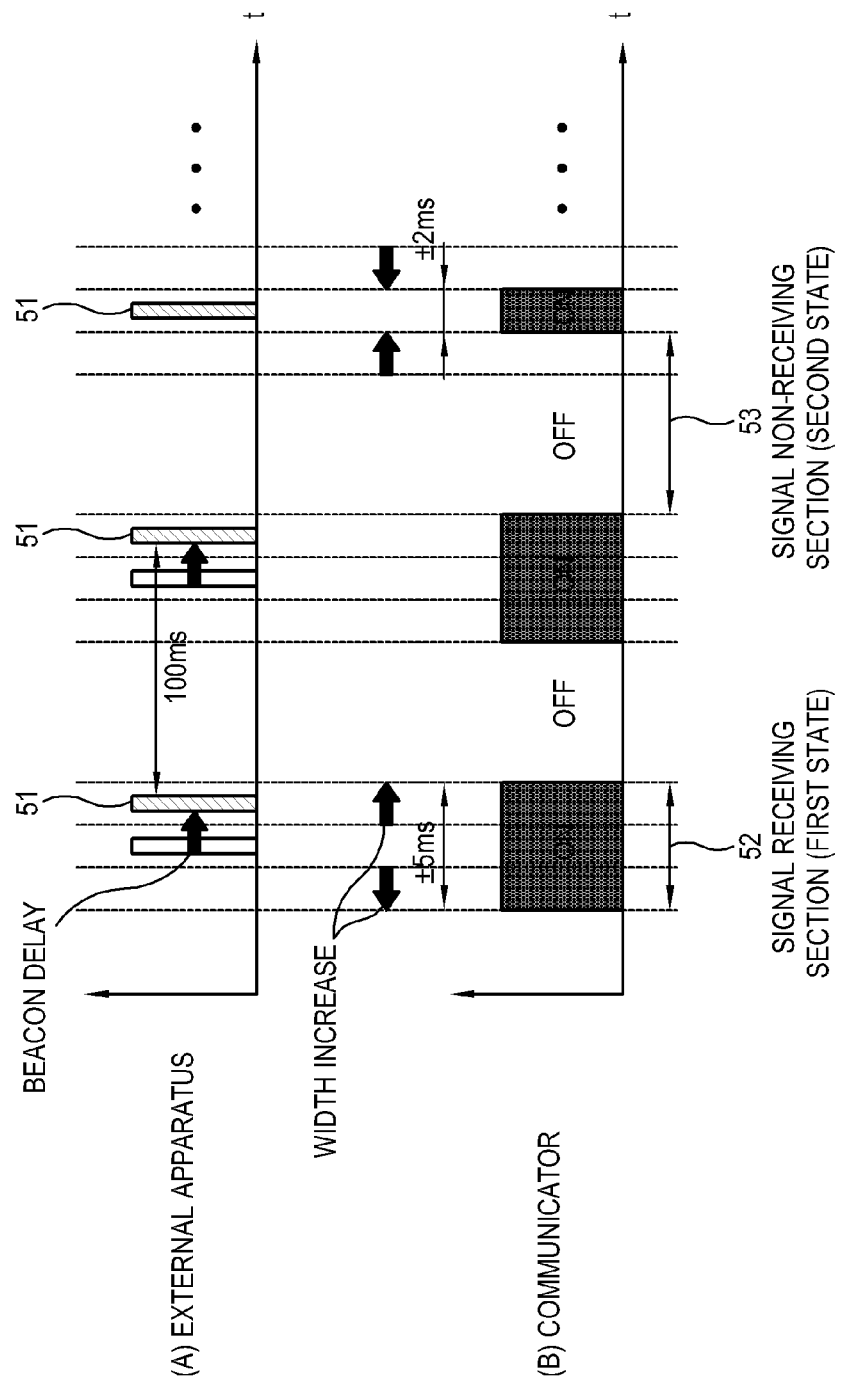
FIG. 5 is a waveform diagram illustrating an example of increasing the signal receiving sections in width if the beacon signals are not received, according to an exemplary embodiment.

If the beacon signals are not received for the signal receiving sections set in the communication-enabled first state, the controller 171 controls the communicator 17 to adjust the signal receiving sections, so that the communicator 17 receives the beacon signals. As an exemplary embodiment, if the beacon signals are not received for the signal receiving sections, the controller 171 may control the communicator 17 to increase the signal receiving sections in width. As an example, as illustrated in FIG. 4, if beacon signals 41, which are emitted from the external apparatus 20, are delayed, the communicator 17 may not receive the beacon signals 41 for signal receiving sections 42, each of which has a width set in 4 ms (±2 ms). At this time, as illustrated in FIG. 5, if signal receiving sections 52 are increased to 10 ms (±5 ms) in width, the communicator 17 may receive delayed beacon signals 51. Also, if after the width of the signal receiving sections 52 is increased, the beacon signals 51 are received, the controller 171 may decrease the width of the signal receiving sections 52 back again.

Figure 6:
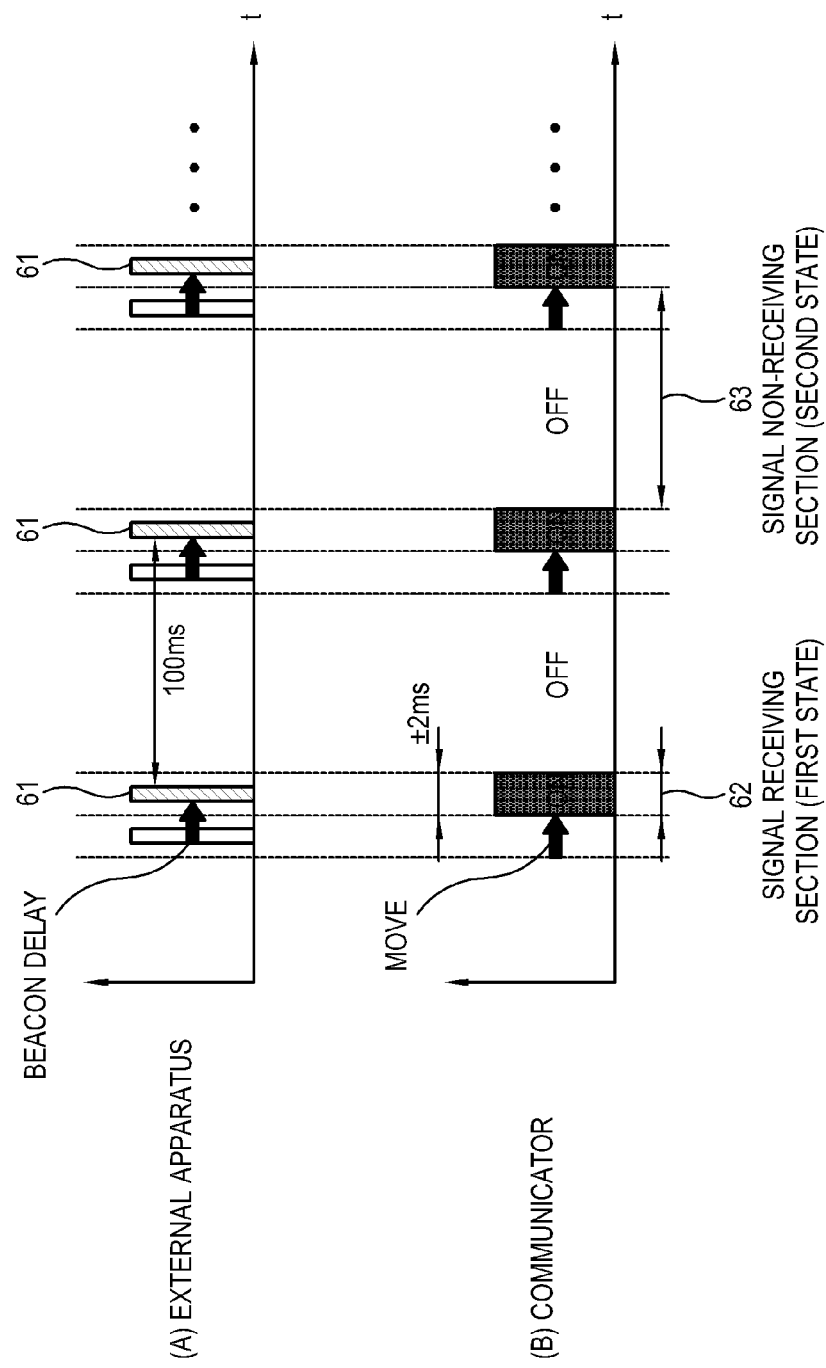
FIG. 6 is a waveform diagram illustrating an example of moving the signal receiving sections if the beacon signals are not received, according to an exemplary embodiment.

As an exemplary embodiment, if the beacon signals are not received for the signal receiving sections, the controller 171 may control the communicator 17 to move the signal receiving sections. As an example, as illustrated in FIG. 6, if beacon signals 61, which are emitted from the external apparatus 20, are delayed, the communicator 17 may receive the delayed beacon signals 61 by moving signal receiving sections 62, for example, to the right to ensure that it receive the delayed beacon signals 61. Here, if after the signal receiving sections 62 are moved, the beacon signals 61 are received, the controller 171 may synchronize with the beacon signals 61 in the moved signal receiving sections 62. In other words, without having to move the signal receiving sections 62 to previous positions again, the controller 171 may receive the beacon signals 61 synchronizing with the beacon signals 61 at the moved positions of the signal receiving sections 62.

Figure 7:
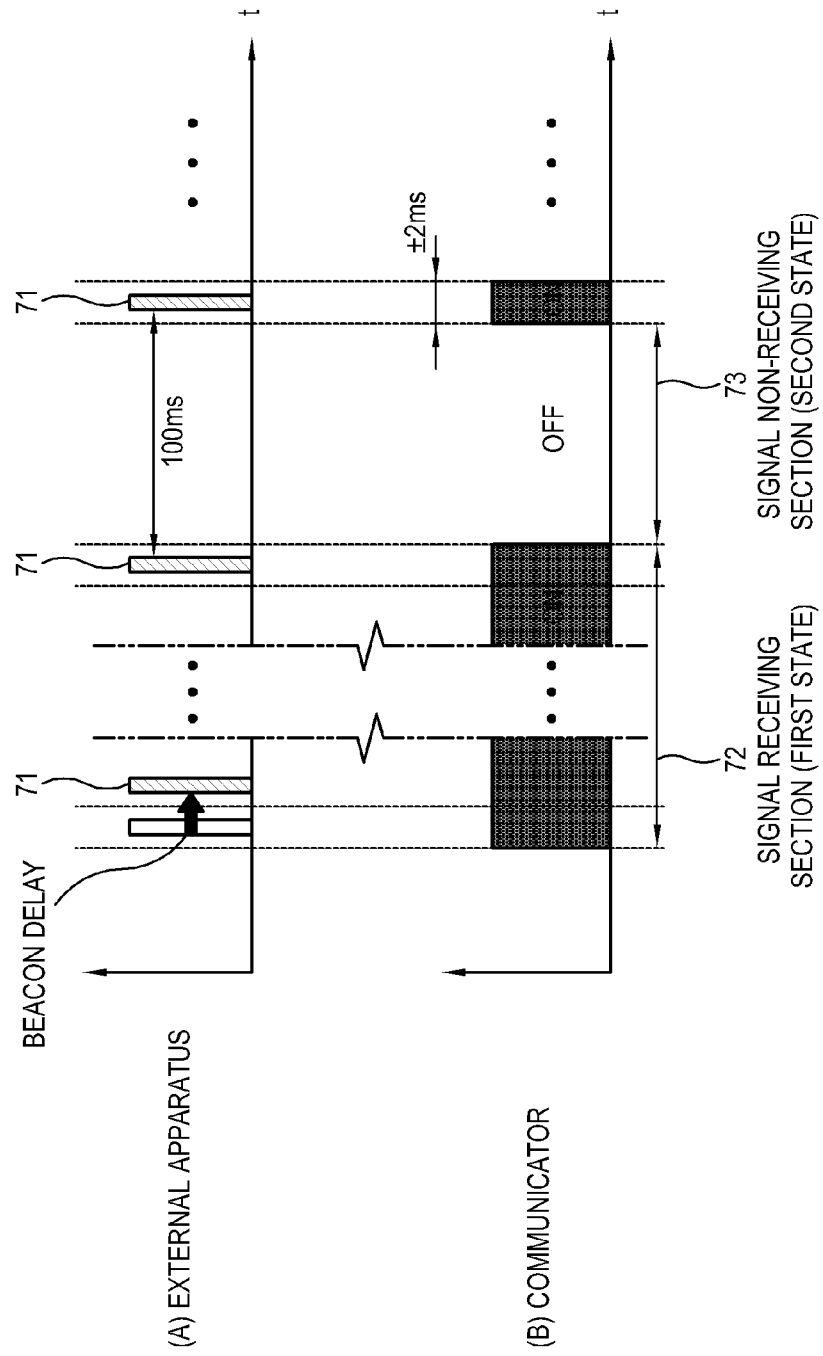
FIG. 7 is a waveform diagram illustrating an example of repeatedly setting the signal receiving sections to a first state, which enables communication, until the beacon signals are received if being not received in an electronic apparatus according to an exemplary embodiment.

As an exemplary embodiment, if the beacon signals are not received for at least one of the signal receiving sections, the controller 171 may control the communicator 17 to enlarge the at least one the signal receiving section until the beacon signals are received and to operate in the first state for the enlarged least one signal receiving section. As an example, as illustrated in FIG. 7, if any beacon signal 71, which is emitted from the external apparatus 20, is delayed, the communicator 17 may be set to enlarge a corresponding signal receiving section 72 to ensure that it receives delayed beacon signal 71 and to operate in the communication-enabled first state for the corresponding signal receiving section 72. Here, the corresponding signal receiving section 72 may be enlarged until a predetermined number of beacon signals 71, for example, the delayed beacon signal 71 and/or a next beacon signal 71 are received, and if the delayed or next beacon signal 71 is received, next signal receiving sections 72 may be changed to the original period and width.

Figure 8:
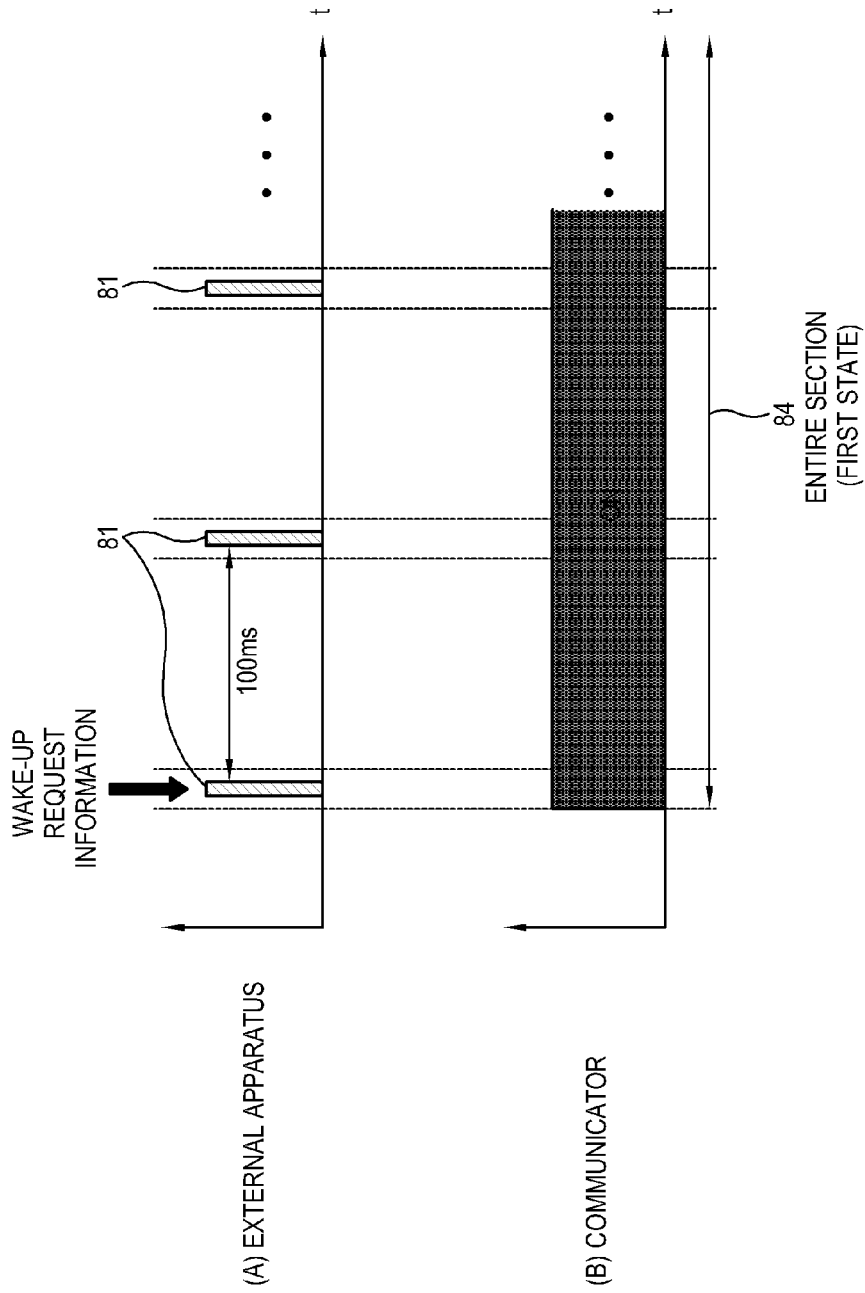
FIG. 8 is a waveform diagram illustrating an example of setting the entire section in the first state to enter the normal mode if wake-up request information is received from the external apparatus, at an electronic apparatus according to an exemplary embodiment.

As an exemplary embodiment, if the communicator 17 receives wake-up request information from the external apparatus 20 in the lower power mode, the controller 171 may control the communicator 17 to ensure that an entire section comes to the first state and thus to operate in a normal mode. At this time, the wake-up request information may include identification information, for example, a MAC address, of the display apparatus 10 indicating that a target device for wake-up is the display apparatus 10. Also, the wake-up request information may include control information of which the external apparatus 20 wakes up the display apparatus 10. As an example, as illustrated in FIG. 8, if the communicator 17 receives the wake-up request information from the external apparatus 20 while receiving beacon signals 81 emitted in intervals of 100 ms in the lower power mode, the controller 171 may start power supply to the main processor 15 based on the wake-up request information. In other words, if the communicator 17 receives the wake-up request in a state where it maintains the connection with the external apparatus 20, the power supply to the main processor 15 is initiated and thus all the components of the display apparatus 10 may be activated according to operations of the main processor 15. At this time, the controller 171 may control the communicator 17 to operate in the communication-enabled first state for an entire section 84 thus to enter the normal mode from the power save mode.

As an exemplary embodiment, if the beacon signals are not received for the signal receiving sections, the controller 171 may determine whether the signal receiving sections should be adjusted according to a user input. As an example, if the beacon signals are not received for the signal receiving sections, the controller 171 may detect an existence of the user using information on surrounding environment. In other words, if the beacon signals are not received, a camera sensor, an audio sensor or the like mounted on the display apparatus 10 is activated to detect whether the user exists in a location close to the display apparatus 10. At this time, if the user are detected in the location close to the display apparatus 10, the controller 171 may display a user interface (UI), which inquiries the user whether the signal receiving sections should be adjusted, on the display 13. The user may adjust the signal receiving sections via a user input on the displayed UI. Also, if the external apparatus 20 is not within a connectable range or the user does not want to connect with the external apparatus 20, she or he may cancel the adjustment of the signal receiving sections via the user input.

The storage 16 stores information on signal receiving sections, which is set by the display apparatus 10 to receive the beacon signals. As an example, with regard to a period or transmission times of the beacon signals transmitted in intervals of 100 ms, a period of the signal receiving sections may be set to 100 ms, and a width of the signal receiving sections may be set to 4 ms (±2 ms). The information on the signal receiving sections set as above is stored in the storage 16, so that if the display apparatus 10 is operated in the power save mode, the display apparatus 10 may set up the signal receiving sections using the stored information. Also, the storage 16 may store information on signal receiving sections adjusted to receive beacon signals when the beacon signals are not received. As an example, if the beacon signals are not received, the width of the signal receiving sections is increased to 10 ms (±5 ms) to allow beacon signals to be received, and the storage 16 may store information on signal receiving sections adjusted as described above. Accordingly, if the beacon signals are not received again, the display apparatus 10 may set up the width of the signal receiving sections using the stored information.

As described above, if the beacon signal signals from connecting with the external apparatus 20 are not normally received, the display apparatus 10 according to the exemplary embodiments may adjust the signal receiving sections to ensure that it receive beacon signals, thereby stably maintaining the connection with the external apparatus.

FIG. 3 is a waveform diagram illustrating an example of setting signal receiving sections to receive beacon signals from the external apparatus, according to an exemplary embodiment. As illustrated in FIG. 3, at the external apparatus 20, beacon signals 31 are transmitted in intervals of 100 ms. See (a). At the display apparatus 10, the communication 17 is set to a communication-enabled first state to receive the beacon signals 31 for signal receiving sections 32 corresponding to transmission times of the beacon signals 31 transmitted from the external apparatus 20, and a communication-disenabled second state for signal non-receiving sections 33. See (b). At this time, a period of the signal receiving sections 32 may be set to 100 ms, which is equal to the period of the beacon signals 31 and a width of the signal receiving sections 32 may be set to 4 ms (±2 ms). Here, the period and the width of the signal receiving sections 32 may also be set to values pre-stored in the storage 16 or by a user input. With the exemplary embodiments as described above, the display apparatus 10 may receive the beacon signals from the external apparatus 20 for the signal receiving sections 32, which enables communications, thus to maintain the connection with the external apparatus 20 and to enable the WoWLAN function.

FIG. 4 is a waveform diagram illustrating an example in which the beacon signals are delayed, so that they are not received from the external apparatus for the signal receiving sections. As illustrated in FIG. 4, if the external apparatus 20 emits beacon signals 41 in intervals of 100 ms and then is confronted with malfunctions or overloads in used frequency channels due to increase in number of connected apparatuses, the beacon signals 41 are slightly delayed and emitted out of the period of 100 ms. See (a). In this case, at the display apparatus 10, the communicator 17 may not receive the beacon signals 41 for the signal receiving sections, each of which has a width set in 4 ms (±2 ms), due to the delays of the beacon signals 41 emitted from the external apparatus 20. See (b). Thus, a problem occurs in that the beacon signals 41 are delayed due to exceptional situations, but the display apparatus 10 misjudges as being disconnected with the external apparatus 20 and ends the connection with the external apparatus 20.

FIG. 5 is a waveform diagram illustrating an example of increasing the signal receiving sections in width if the beacon signals are not received, according to an exemplary embodiment. As illustrated in FIG. 5, if the external apparatus 20 emits beacon signals 51 in intervals of 100 ms and then is confronted with malfunctions or overloads in used frequency channels due to increase in number of connected apparatuses, the beacon signals 51 are slightly delayed and emitted out of the period of 100 ms. See (a). In this case, at the display apparatus 10, the communicator 17 may not receive the beacon signals 51 for the signal receiving sections, each of which has a width set in 4 ms (±2 ms) due to the delays of the beacon signals 51 emitted from the external apparatus 20. See (b). At this time, the display apparatus 10 may receive the delayed beacon signals 51 by increasing a width of the signal receiving sections 52 to 10 ms (±5 ms). Also, if after the width of the signal receiving sections 52 is increased, the beacon signals are received, the display apparatus 10 may decrease the width of the signal receiving sections 52 back again.

FIG. 6 is a waveform diagram illustrating an example of moving the signal receiving sections if the beacon signals are not received, according to an exemplary embodiment. As illustrated in FIG. 6, if the external apparatus 20 emits beacon signals 61 in intervals of 100 ms and then is confronted with malfunctions or overloads in used frequency channels due to increase in number of connected apparatuses, the beacon signals 61 are slightly delayed and emitted out of the period of 100 ms. See (a). In this case, at the display apparatus 10, the communicator 17 may not receive the beacon signals 61 for the signal receiving sections, each of which has a width set in 4 ms (±2 ms), due to the delays of the beacon signals 61 emitted from the external apparatus 20. See (b). At this time, the communicator 17 may receive the delayed beacon signals 61 by moving the signal receiving sections 62 to the right to ensure that the delayed beacon signals 61 are received. Also, if after the signal receiving sections 62 are moved, the beacon signals 61 are received, the display apparatus 10 may synchronize with beacon signals 61 in the moved signal receiving sections 62.

FIG. 7 is a waveform diagram illustrating an example of setting the signal receiving sections to a first state, which enables communications, until the beacon signals are received if being not received in an electronic apparatus according to an exemplary embodiment. As illustrated in FIG. 7, if the external apparatus 20 emits beacon signals 71 in intervals of 100 ms and then is confronted with malfunctions or overloads in used frequency channels due to increase in number of connected apparatuses, the beacon signals 71 are slightly delayed and emitted out of the period of 100 ms. See (a). In this case, at the display apparatus 10, the communicator 17 may not receive the beacon signals 71 for the signal receiving sections, each of which has a width set in 4 ms (±2 ms), due to the delays of the beacon signals 71 emitted from the external apparatus 20. See (b). At this time, the communicator 17 enlarges a signal receiving section 72, which fails to receive a delayed beacon signal 71, to ensure that it receives the delayed beacon signal 71 and is operated in the communication-enabled first state for the enlarged signal receiving section 72. The signal receiving section 72 may be enlarged until a predetermined number of beacon signals 71, for example, the delayed beacon signal 71 and/or a next beacon signal 71 is received, and if the delayed and/or next beacon signal 71 is received, next signal receiving sections 72 may be changed to the original period and width.

FIG. 8 is a waveform diagram illustrating an example of setting all the sections in the first state to enter the normal mode if wake-up request information is received from the external apparatus in an electronic apparatus according to an exemplary embodiment. As illustrated in FIG. 8, at the external apparatus 20, beacon signals 81 are emitted in intervals of 100 ms. See (a). If while receiving the beacon signals 81 emitted in intervals of 100 ms in the lower power mode, the communicator 17 receives the wake-up request information from the external apparatus 20, the display apparatus 10 may control the communicator 17 to operate in the communication-enabled first state for an entire section 84 to enter the normal mode from the power save mode. See (b). The wake-up request information may include identification information, for example, a MAC address, of the display apparatus 10 indicating a target device for wake-up, and control information for waking up the display apparatus 10. At this time, power supply to the main processor 15 may be initiated based on the wake-up request information and all the components of the display apparatus 10 may be activated according to operations of the main processor 15.

Figure 9:
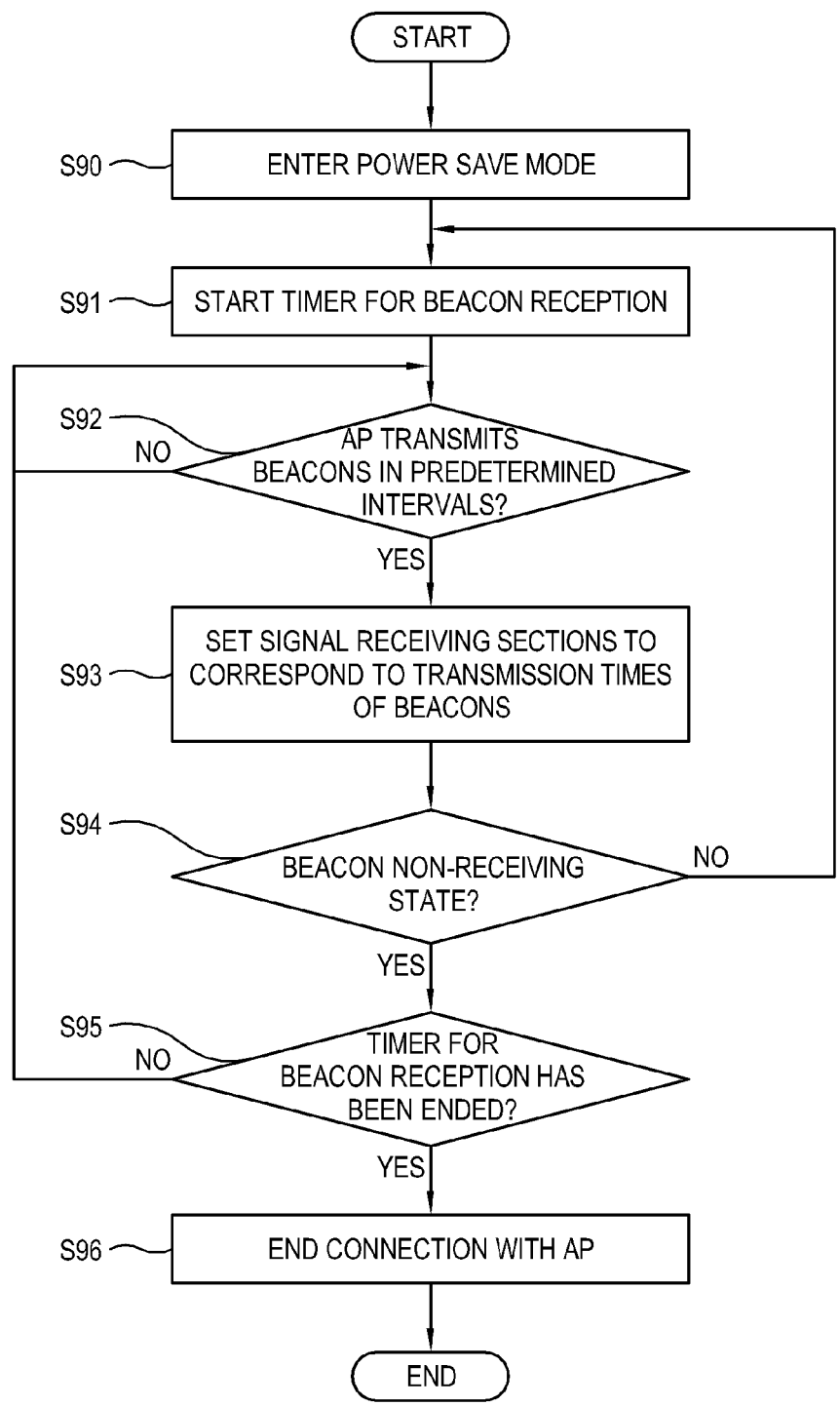
FIG. 9 is a flow chart illustrating a control method of a display apparatus according to an exemplary embodiment.

FIG. 9 is a flow chart illustrating a control method of a display apparatus according to an exemplary embodiment. As illustrated in FIG. 9, at an operation S90, the display apparatus first enters a lower power mode and at an operation S91, starts a timer for beacon reception. At an operation S92, the display apparatus determines whether an AP transmits beacons in predetermined intervals. If it is determined that the AP transmits the beacons in the predetermined intervals, at an operation S93, the display apparatus sets signal receiving sections to correspond to the transmission times of the beacons. At an operation S94, the display apparatus determines whether it is a state where the beacons are not received for the signal receiving sections. If it is the state where the beacons are not received, at an operation S95, the display apparatus checks whether the timer for beacon reception has been ended and if the timer for beacon reception has been ended, at an operation S96, ends the connection with the AP. In other words, if the beacons are not received for the signal receiving sections, the display apparatus determines that the AP is not within a connectable range therewith and ends the connection with the AP.

If at the operation S94, it is a state where the beacons are received for the signal receiving sections, the display apparatus determines that it is normally connected with the AP, and repeatedly performs the operations S91 to S94.

On the other hand, if at the operation S92, the AP does not transmit the beacons in the predetermined intervals, at the operation S95, the display apparatus checks whether the timer for beacon reception has been ended and if the timer for beacon reception has been ended, at the operation S96, ends the connection with the AP.

Figure 10:
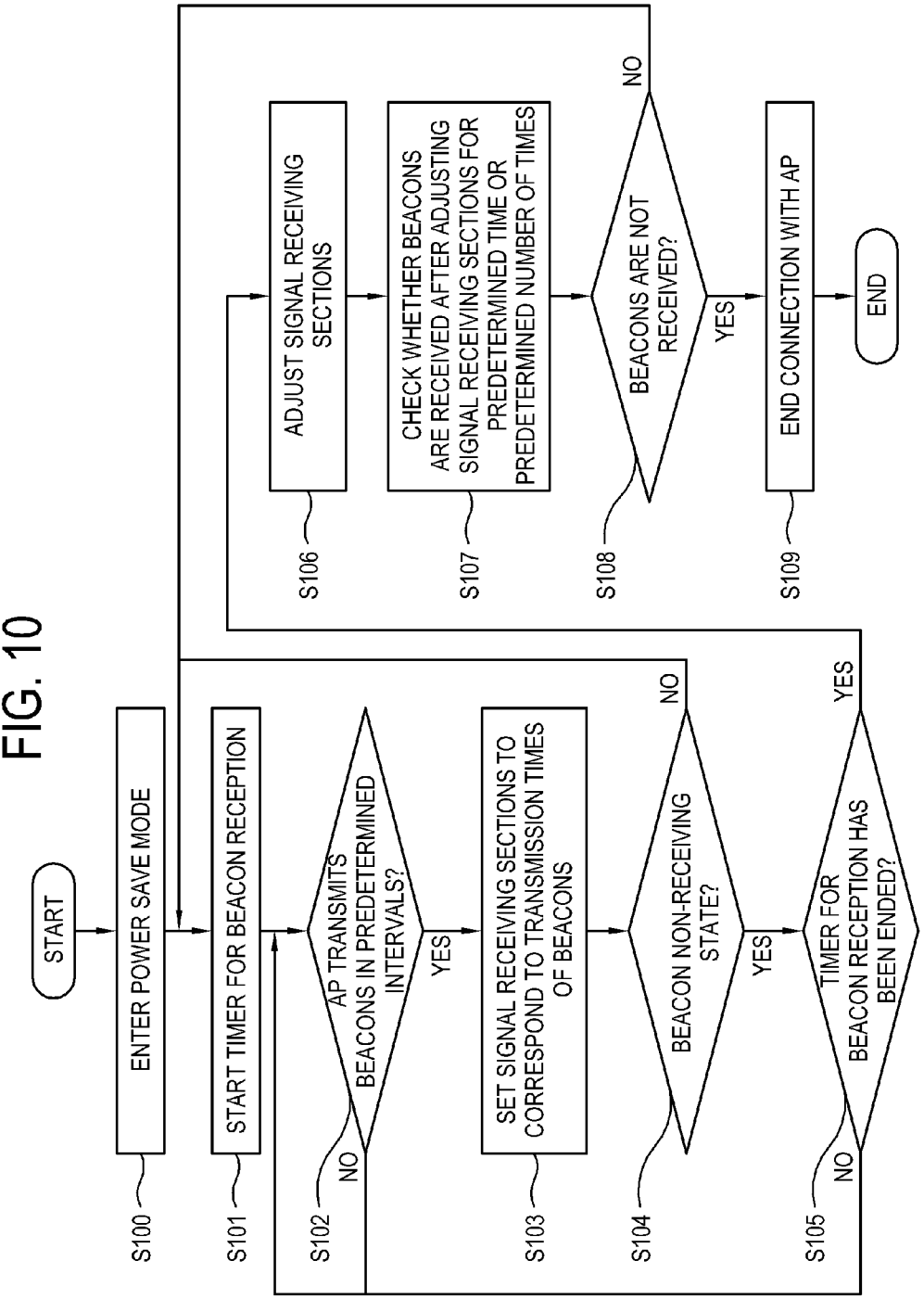
FIG. 10 is a flow chart illustrating a control method of a display apparatus according to another exemplary embodiment.

FIG. 10 is a flow chart illustrating a control method of a display apparatus according to another exemplary embodiment. As illustrated in FIG. 10, at an operation S100, the display apparatus first enters a lower power mode and at an operation S101, starts a timer for beacon reception. At an operation S102, the display apparatus determines whether an AP transmits beacons in predetermined intervals. If it is determined that the AP transmits the beacons in the predetermined intervals, at an operation S103, the display apparatus 10 sets signal receiving sections to correspond to the transmission times of the beacons. At an operation S104, the display apparatus determines whether it is a state where the beacons are not received for the signal receiving sections. If it is the state where the beacons are not received, at an operation S105, the display apparatus checks whether the timer for beacon reception has been ended and if the timer for beacon reception has been ended, at an operation S106, adjusts the signal receiving sections to allow the beacons to be received. Here, the operation S106 may include increasing the signal receiving sections in width, or moving the signal receiving sections.

At an operation S107, the display apparatus checks whether the beacons are received after adjusting the signal receiving sections for a predetermined time or a predetermined number of times and at an operation S108, if it is a state where the beacons are not received, at an operation 109, ends the connection with the AP. In other words, if the beacons are not received despite the repetitive adjustments of the signal receiving sections, the display apparatus determines that the AP is not within a connectable range therewith and ends the connection with the AP.

If at the operation S108, the beacons are received by adjusting the signal receiving sections for the predetermined time or the predetermined number of times, the display apparatus determines that it is normally connected with the AP, and repeatedly performs the operations S101 to S108.

Figure 11:
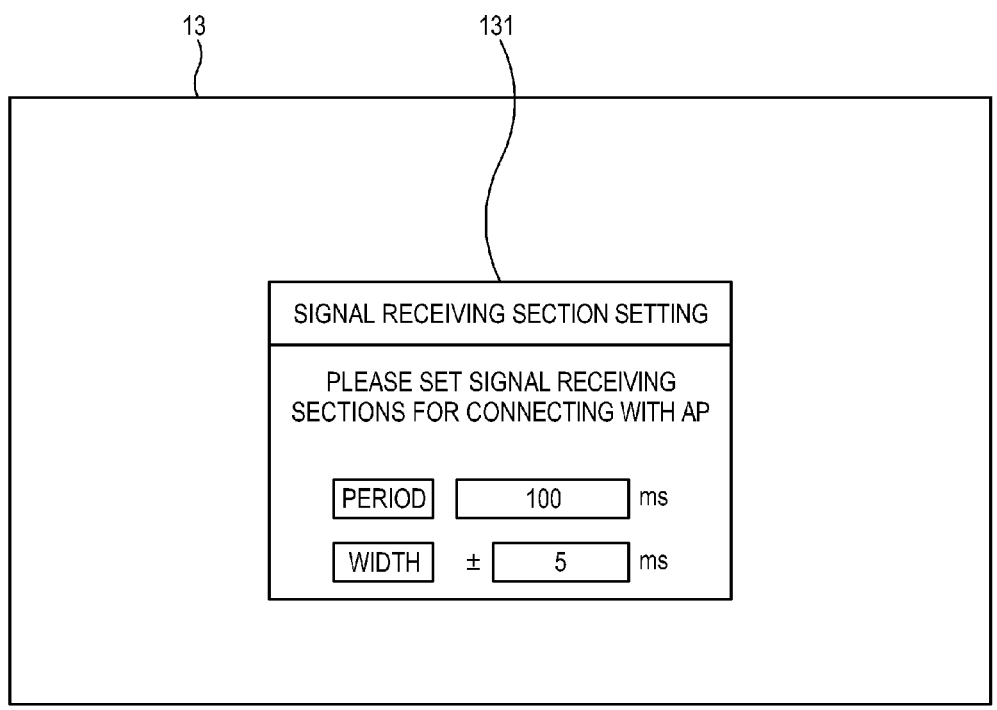
FIG. 11 are a drawing illustrating an example of setting a period and a width of the signal receiving sections according to a user input according to an exemplary embodiment.

FIG. 11 are a drawing illustrating an example of setting a period and a width of the signal receiving sections based on a user input according to an exemplary embodiment. As illustrated in FIG. 11, the controller 171 may set the period and the width of the signal receiving sections according to the user input. As an exemplary embodiment, the controller 171 may display a UI 131 for setting up the signal receiving sections on the display 13 and set the period and the width of the signal receiving sections based on a user input with respect to the UI 131. As an example, to set signal receiving sections corresponding to transmission times of the beacon signals emitted in intervals of 100 ms into a first state, which enables communications, the user may set the period of the signal receiving sections to 100 ms, which is equal to the period of the beacon signals, and the width of the signal receiving sections to 4 ms (±2 ms). Also, if the beacon signals are delayed and not received for the signal receiving sections set in the width of 4 ms (±2 ms), the user may change the width of the signal receiving sections to 10 ms (±5 ms) via the UI 131.

As described above, to receive the beacon signals for connecting with the external apparatus 20, the display apparatus 10 according to the exemplary embodiments may automatically set up the period and the width of the signal receiving sections to the pre-stored values, or set them according to the user input.

Figure 12:
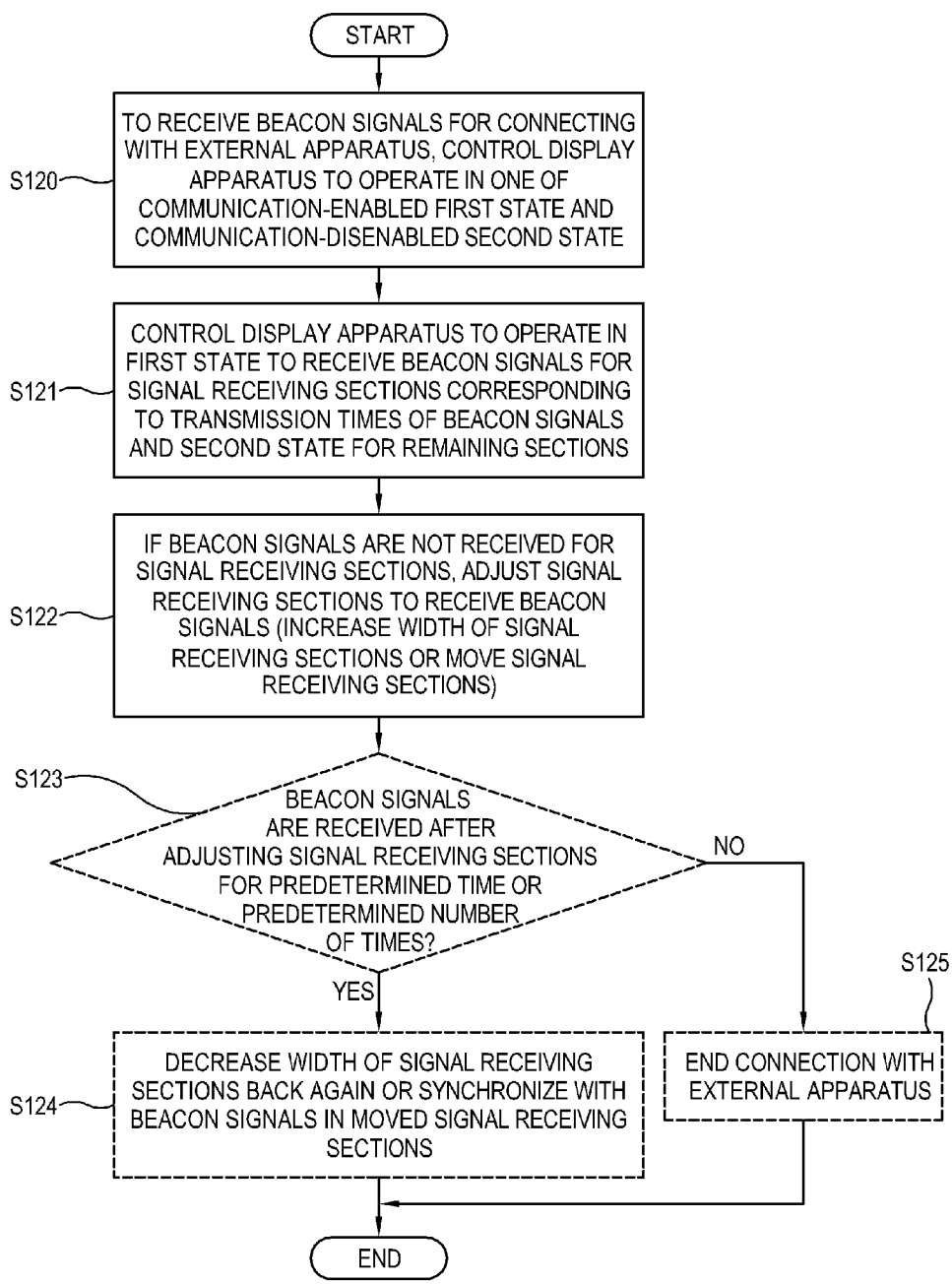
FIG. 12 is a flow chart illustrating a control method of a display apparatus according to other exemplary embodiment.

FIG. 12 is a flow chart illustrating a control method of a display apparatus according to other exemplary embodiment. As illustrated in FIG. 12, at an operation S120, the display apparatus is controlled to operate in one of a first state, which enables communications, to receive beacon signals for connecting with the external apparatus and a second state, which disenables the communications. At an operation S121, the display apparatus is controlled to operate in the first state to receive the beacon signals for signal receiving sections corresponding to transmission times of the beacon signals, and the second state for remaining sections.

As an exemplary embodiment, the operation S121 may include, if the display apparatus is operated in a power save mode, controlling the display apparatus to operate in the first state for the signal receiving sections and the second state for the remaining sections. Also, the operation S121 may include, if the display apparatus receives wake-up request information from the external apparatus in the power save mode, controlling the display apparatus to come into the first state for all the sections and to operate in a normal mode.

At an operation S122, if in the first state, the beacon signals are not received for the signal receiving sections, the display apparatus adjusts the signal receiving sections to receive the beacon signals. Here, the operation S122 may include, if the beacon signals are not received for the signal receiving sections, increasing the signal receiving sections in width. Also, the operation S122 may include, if the beacon signals are not received for the signal receiving sections, moving the signal receiving sections.

As an exemplary embodiment, the method may include, if the beacon signals are not received for the signal receiving sections, determining whether the signal receiving sections should be adjusted according to a user input. As an example, if the beacon signals are not received, the display apparatus may detect an existence of the user based on information with respect to surrounding environments obtained from a camera sensor, an audio sensor or the like and if the user are detected, display a user interface (UI), which inquiries the user whether the signal receiving sections should be adjusted, to allow the user to select whether to adjust the signal receiving sections.

Operations S123 to S125 may be selectively performed.

At the operation S123, the display apparatus determines whether the beacon signals are received after adjusting the signal receiving sections for a predetermined times or a predetermined number of times. If it is determined that the beacon signals are received, at the operation S124, the display apparatus decreases the width of the signal receiving sections to the original value or synchronizes with the beacon signals in the moved signal receiving sections.

At the operation S123, if it is determined that the beacon signals are not received, at the operation S125, the display apparatus determines that the external apparatus is not within a connectable range therewith and ends the connection with the external apparatus.

While the exemplary embodiments have been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
  a communicator; and
  a controller configured to:
    in response to the communicator receiving a beacon signal at a signal receiving section of time from an external apparatus, to control the communicator to maintain a connection with the external apparatus in a power save mode, and in response to the communicator not receiving the beacon signal at the signal receiving section of time for a predetermined period from the external apparatus in the power save mode, to end the connection with the external apparatus,
    in response to the communicator receiving a wake-up request signal from the external apparatus in the power save mode while the communicator maintains the connection with the external apparatus, to operate in a normal mode, and
    in response to the communicator not receiving the beacon signal at the signal receiving section of time for the predetermined period from the external apparatus in the power save mode, to control the communicator to adjust the signal receiving section of time to receive the beacon signal.

2. The apparatus according to claim 1, wherein the controller is further configured to, in response to the communicator not receiving the beacon signal for the signal receiving section of time, control the communicator to increase the signal receiving section of time in time width.

3. The apparatus according to claim 2, wherein the controller is further configured to, in response to the beacon signal being received for the signal receiving section of time after increasing the signal receiving section of time in time width, control the communicator to decrease the signal receiving section of time in time width.

4. The apparatus according to claim 1, wherein the controller is further configured to, in response to the beacon signal not being received for the signal receiving section of time, control the communicator to move the signal receiving section of time.

5. The apparatus according to claim 4, wherein the controller is further configured to, in response to the beacon signal being received after moving the signal receiving section of time, synchronize with the beacon signal in the moved signal receiving section of time.

6. The apparatus according to claim 1, wherein the controller is further configured to:
control the communicator to adjust the signal receiving section of time for a predetermined time or a predetermined number of times, and
in response to the beacon signal not being received after the communicator adjusting the signal receiving section of time for the predetermined time or the predetermined number of times, control the communicator to end the connection with the external apparatus.

7. The apparatus according to claim 1, wherein the controller is further configured to, in response to the beacon signal not being received for the signal receiving section of time, determine whether the signal receiving section of time is to be adjusted according to a user input.

8. The apparatus according to claim 1, further comprising:
a user input receiver configured to receive a user input, wherein the controller is further configured to set a period and time width of the signal receiving section of time according to the user input.

9. A control method of a display apparatus comprising:
in response to a communicator receiving a beacon signal at a signal receiving section of time from an external apparatus, maintaining a connection with the external apparatus in a power save mode, or in response to the communicator not receiving the beacon signal at the signal receiving section of time for a predetermined period from the external apparatus in the power save mode, ending the connection with the external apparatus, and
in response to the communicator receiving a wake-up request signal from the external apparatus in the power save mode while the communicator maintains the connection with the external apparatus, operating in a normal mode,
wherein the ending comprises, in response to the communicator not receiving the beacon signal at the signal receiving section of time for the predetermined period from the external apparatus in the power save mode, adjusting the signal receiving section of time to receive the beacon signal.

10. The method according to claim 9, wherein the adjusting comprises, in response to the communicator not receiving the beacon signal for the signal receiving section of time, increasing the signal receiving section of time in time width.

11. The method according to claim 10, wherein the adjusting further comprises, in response to the beacon signal being received for the signal receiving section of time after increasing the signal receiving section of time in time width, decreasing the signal receiving section of time in time width.

12. The method according to claim 9, wherein the adjusting comprises, in response to the beacon signal not being received for the signal receiving section of time, moving the signal receiving section of time.

13. The method according to claim 12, wherein the adjusting further comprises, in response to the beacon signal being received after moving the signal receiving section of time, synchronizing with the beacon signal in the moved signal receiving section of time.

14. The method according to claim 9, further comprising:
controlling the communicator to adjust the signal receiving section of time for a predetermined time or a predetermined number of times, and
in response to the beacon signal not being received after adjusting the signal receiving section of time for the predetermined time or the predetermined number of times, ending the connection with the external apparatus.

15. The method according to claim 14, further comprising:
in response to the beacon signal not being received for the signal receiving section of time, determining whether the signal receiving section of time is to be adjusted according to a user input.

16. The method according to claim 9, further comprising:
setting a period and time width of the signal receiving section of time according to a user input.

* * * * *